United States Patent [19]

Nascimento

[11] 4,359,915
[45] Nov. 23, 1982

[54] METHOD OF MAKING A PRECISION DIE SET

[76] Inventor: Agostinho U. Nascimento, 15530 Garrison Line, Southgate, Mich. 48195

[21] Appl. No.: 139,161

[22] Filed: Apr. 11, 1980

[51] Int. Cl.³ .......................... B23Q 3/00; B21K 5/20
[52] U.S. Cl. .................................. 76/107 R; 83/619; 29/465
[58] Field of Search .................. 76/107 R; 83/13, 619, 83/466.1, 698, 701; 33/181 R; 408/1 R; 29/465

[56] References Cited

U.S. PATENT DOCUMENTS

| 2,504,642 | 4/1950 | Burgess | 83/13 |
| 3,089,376 | 5/1963 | Whistler et al. | 83/619 |
| 3,126,776 | 3/1964 | Whistler et al. | 83/13 |
| 3,150,550 | 9/1964 | Berlin et al. | 83/13 |
| 3,244,489 | 4/1966 | Parker | 29/465 |
| 3,504,576 | 4/1970 | Silberman et al. | 29/458 |
| 3,782,166 | 1/1974 | Whistler et al. | 83/619 |
| 4,103,413 | 8/1978 | Malmberg | 29/465 |

Primary Examiner—Roscoe V. Parker
Attorney, Agent, or Firm—Norbert M. Lisicki

[57] ABSTRACT

A method of making precision dies sets is provided with apparatus for holding retainer blocks in proper alignment in order to bore dowel-receiving and screw-receiving holes.

7 Claims, 10 Drawing Figures

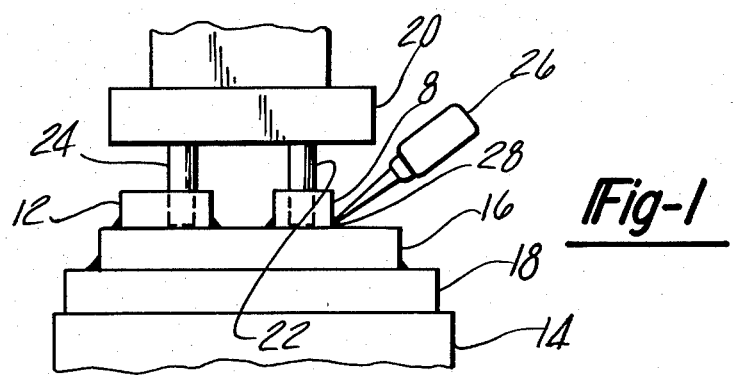
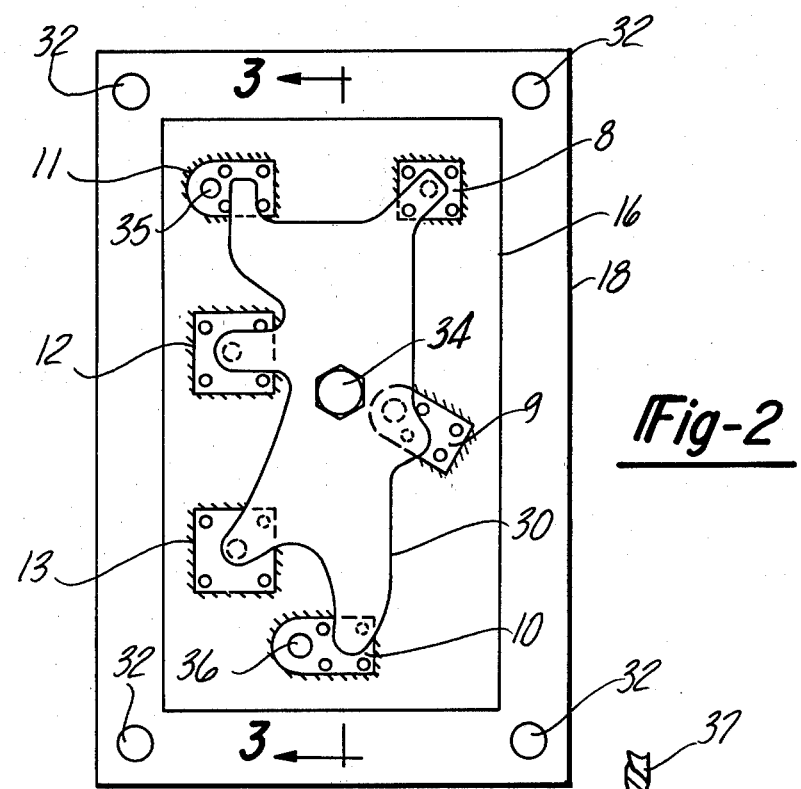
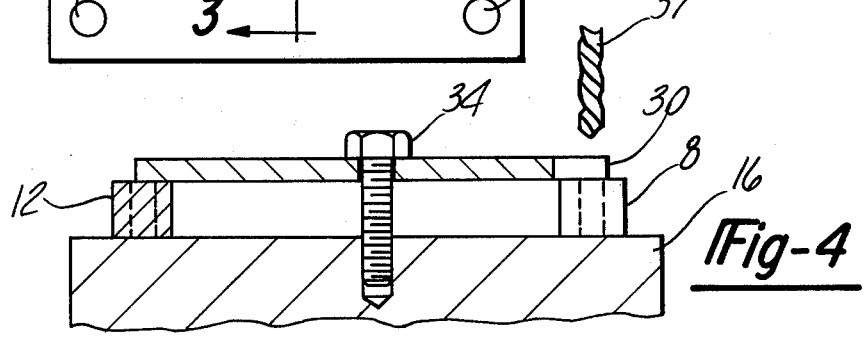

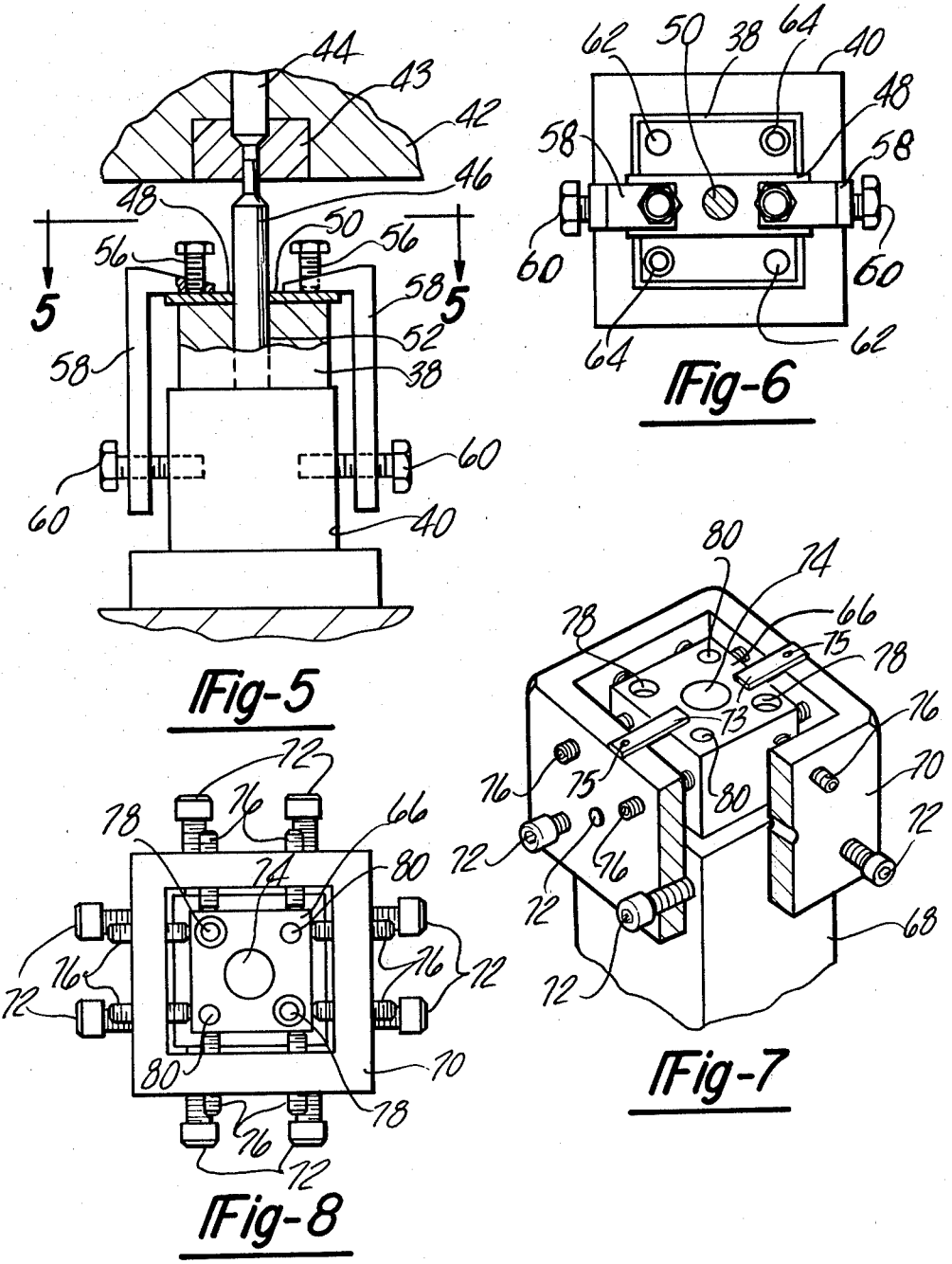

METHOD OF MAKING A PRECISION DIE SET

BACKGROUND OF THE INVENTION

1. Field of the Invention

The present invention relates to a new and novel multiple retainer setting fixture and more particularly to a punch and die assembly which may be adapted for the perforation of sheet metal materials. The invention is adaptable to either single retainer blocks or a multiplicity of retainer blocks.

2. Description of the Prior Art

In the punch and die industry, one of the major problems is the alignment of the two retainer blocks with the master die block. The general practice is to align the retainer blocks with the punch shoe and then either insert a scribing tool into the screw receiving openings in the retainer block and scribe circles on the underside of the punch or scribe lines along the outer edge of the retainer block so that when the retainer block has been removed, it can be replaced in exact fashion. This, of course, creates problems of proper alignment with the scribe lines and furthermore, proves to be an extremely time consuming procedure. Wherein, if a multiplicity of retainer blocks are to be located upon a die shoe, then that particular die shoe would require a multiplicity of trips back and forth between the die setting room and the drill room in order to properly align and drill said screw receiving openings. The prior art teaches that magnetic inserts may be used for holding a retainer in the proper position on a die shoe such as is taught and claimed in U.S. Pat. Nos. 3,089,376 and 3,782,166. Another procedure is to employ epoxy adhesive for locating bushings to be applied between bushings and punch holder and between die post and die holder as is taught and claimed in U.S. Pat. No. 3,504,576. Another procedure is that which is taught by U.S. Pat. No. 3,126,776 wherein one of the retainers is initially fixed securely to its associated shoe and then a transfer means or spoting fixture is engaged with this retainer and properly aligned therewith.

BRIEF DESCRIPTION OF THE DRAWINGS

FIG. 1 is a side view of the preferred embodiment of the invention;

FIG. 2 is an enlarged top view of the preferred embodiment of the invention with the punch shoe and location punch removed for clarity;

FIG. 4 is a partial sectional side view of the preferred embodiment;

FIG. 5 is a side view of an alternate embodiment of the present invention;

FIG. 6 is a sectional view along 5—5 of FIG. 5.

FIG. 7 is a top view of another alternate embodiment of the present invention;

FIG. 8 is a perspective partial sectional view of FIG. 7;

DESCRIPTION OF THE PREFERRED EMBODIMENT

Figure 3:
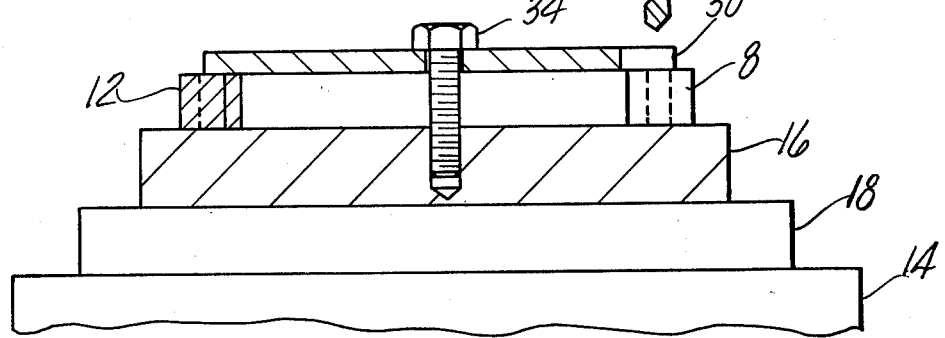
FIG. 3 is a side sectional view along 3—of FIG. 2.

Referring now to the drawings, and in particular, to FIGS. 1-4, there are illustrated, conventional tool retainer blocks indicated by the numerals 8, 9, 10, 11, 12, and 13, which are mounted in a die shoe indicated by the numeral 14 and which is spaced therefrom by a backing plate indicated by the numeral 16. The pedestal 18 is employed wherein the tool retainer blocks 8, 9, 10, 11, 12, and 13, the die shoe 14 and the backing plate 16 are mounted thereon. The punch shoe 20 is spaced above die shoe 14 and contains location punches 22 and 24. The shear plastic applicator 26 is employed to apply the shear plastic 28 after locating the retainer block 8 with punch 22. Other suitable means such as tack welding may be employed to secure the retainer block until the appropriate holes are drilled. The remaining retainer blocks 9, 10, 11, 12, and 13 are located with the appropriate punches and shear plastic 28 is then applied in order to hold said retainer blocks in place. Upon securing said retainer blocks, a template similar to that of metal top plate 30, is prepared allowing sufficient space to provide for drilling out the appropriate holes into the backing plate 16. If the retainers are not the same height, shims or other means may be employed to equalize the pressure of top plate 30. The metal top plate 30 is then prepared from the template and said metal top plate 30 is attached across the retainer blocks 8, 9, 10, 11, 12, and 13 by means of top plate bolt 34. Pedestal bolts 32 are removed and the entire assembly is then transported to the drill press room employing drill 37 for drilling out the various holes as exemplified by dowel holes 35 and 36. FIGS. 3 and 4 exemplify a side view of two variations in attaching retainer blocks to the die shoe 14. The retainer blocks may be simply attached to the backing plate 16 or the assembly may also include the pedestal 18 and the die shoe 14.

Another embodiment of the invention can be seen in FIGS. 5 and 6. Retainer block 38 is positioned on pedestal 40 in such a manner that master die 42 containing master die insert 43 with master punch hole 44 is lowered down unto a location punch 46, at which point, retainer block 38 is moved in such a manner that location punch 46 can be rotated both in the retainer hole 52 and in master punch hole 44 simultaneously, thus aligning location punch with the retainer punch hole 52. Location punch hole plate 48 is placed over location punch 46 through plate hole 50. Plate clamps 58 are placed over location punch hole plate and fastened securely to said punch hole plate by use of plate fastening bolts 56 and 60, wherein plate clamp bolts 60 are threaded into pedestal 40 with appropriate screw holes. Clamps 56 are screwed down to tighten securely location punch hole plate 48 in such a manner that retainer block 38 becomes immovable upon pedestal 40. At this point, the master die is removed from retainer block 38 and retainer block 38 may then be transported to appropriate drill press wherein either dowel holes and/or retainer screw holes may be drilled.

FIG. 6 shows a top view of said retainer block 38 and pedestal 40 with location punch hole plate 48 held in position by means of plate clamps 58 fastened with plate clamp bolts 60, retainer screw hole 62 and dowel hole 64 can then be drilled with the appropriate drill bits.

Still another embodiment of the invention can be seen in FIGS. 7 and 8 wherein retainer block 66 is loosely mounted on pedestal 68 with precision location tool body 70 employing level fastening bolt 72 unto pedestal 68 to retainer block 66, is then located in a manner similar to that employed for locating retainer block 38 as described in FIGS. 5 and 6 by employing a master location punch, not shown, employing punch hole 74.

Retainer strips 73 may be used to hold retainer block 66 by attaching strips 73 employing screws 75. When retainer block 66 has been properly located, then location bolts 76 can be tightened to retainer block 66 upon pedestal 68 at which point dowel holes 78 and screw holes 80 may be drilled employing the appropriate size drill bit.

Figure 9:
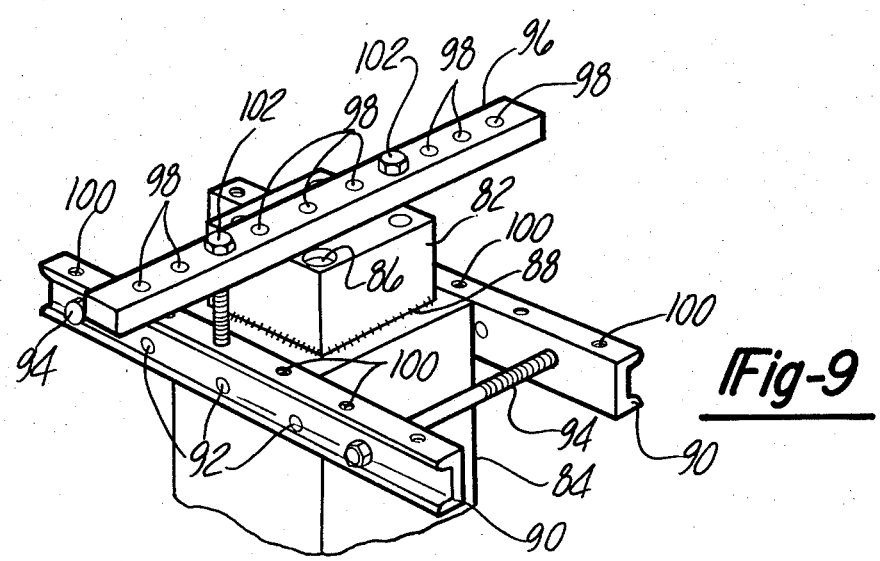
FIG. 9 is a perspective view of still another alternate embodiment.
Figure 10:
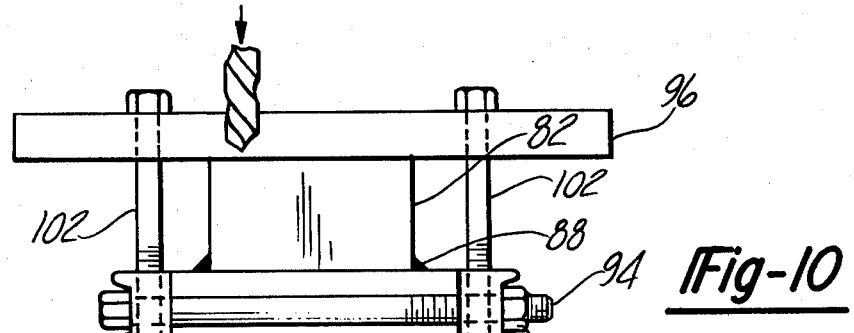
FIG. 10 is a side plane view of still another alternate embodiment.

Still another embodiment of the invention can be seen in FIGS. 9 and 10 wherein retainer block 82 is loosely located upon pedestal 84, its position is then determined by employing a master die with a location punch through dowel hole number 86. Upon proper location of said dowel hole, shear plastic 88, as employed in FIGS. 1-4, is applied to retainer block 82 and pedestal 84 to semi-securely mount said retainer block. After giving the shear plastic sufficient time to harden, lower clamps 90 are positioned onto pedestal 84 employing side lower clamps with holes 92 employing bottom clamp bolts 94. Upper clamp 96 is then positioned over retainer block 82 employing upper clamp bolts 102 through oblong holes 98 in the upper clamp 96, said upper clamp bolts 102 entering threaded tap holes 100 in lower clamp 90. Bottom clamp bolts 94 are securely fastened to lower clamp 90 by means of bottom clamp bolt nuts 104. After having securely mounted retainer block 82 upon pedestal 84, the appropriate dowel and retainer screw holes may be drilled.

The embodiments of this invention in which an exclusive privilege or property is claimed are as follows:

1. A method of making a precision die set comprising
   (a) mounting a first retainer block upon a die shoe in the proper position by alignment with a punch shoe and applying shear plastic to hold said retainer block in position,
   (b) repeating step (a) with a multiplicity of retainer blocks,
   (c) securing said retainer blocks to said die shoe by means of a metal top plate,
   (d) removing said die shoe assembly from a pedestal, and
   (e) drilling appropriate dowel-receiving and screw-receiving holes.

2. A method of making a precision die set comprising:
   (a) mounting a tool retainer block upon a die shoe, said tool retainer block having a portion defining at least one location punch hole;
   (b) aligning a location punch with said at least one location punch hole;
   (c) temporarily securing said tool retainer block to said die shoe by means of said location punch in said location punch hole and plate clamps; and
   (d) drilling appropriate dowel-receiving and screw-receiving holes.

3. A method of making a precision die set as claimed in claim 2 wherein said securing step further comprises holding said tool retainer block to said die shoe by means of a top plate.

4. A method of making a precision die set as claimed in claim 2 further comprising before the securing step:
   applying shear plastic to hold said tool retainer block to said die shoe.

5. A method of making a precision die set comprising:
   (a) mounting a retainer block upon a die pedestal, said retainer block being located upon said die pedestal in the proper position by alignment with a punch shoe;
   (b) temporarily securing said retainer block to said die pedestal by means of a precision location tool body, said tool body capable of fitting over said retainer block and said die pedestal;
   (c) employing level fastening bolts to temporarily attach said tool body to said die pedestal;
   (d) using location bolts to secure said tool body to said die pedestal; and
   (e) drilling appropriate holes in said retainer block.

6. A method of making a precision die set as claimed in claim 5 further comprising before the securing step:
   applying shear plastic to hold said tool retainer block to said die shoe.

7. A method of making a precision die set comprising:
   (a) mounting a retainer block upon a pedestal, said retainer block being placed upon said pedestal in the proper position by alignment of a punch shoe and applying shear plastic to temporarily hold said retainer block in the proper position;
   (b) temporarily attaching clamps to hold said retainer block to said pedestal said clamp having an upper clamp and a lower clamp opposite said upper clamp, said upper clamp mounted over said retainer block, said lower clamp mounted to said pedestal, said lower and upper clamp further being cooperatively joined by suitable means; and
   (c) drilling appropriate holes in said retainer block.

* * * * *